No. 879,215. PATENTED FEB. 18, 1908.
L. THIEL.
VARIABLE SPEED MECHANISM.
APPLICATION FILED JUNE 3, 1907.
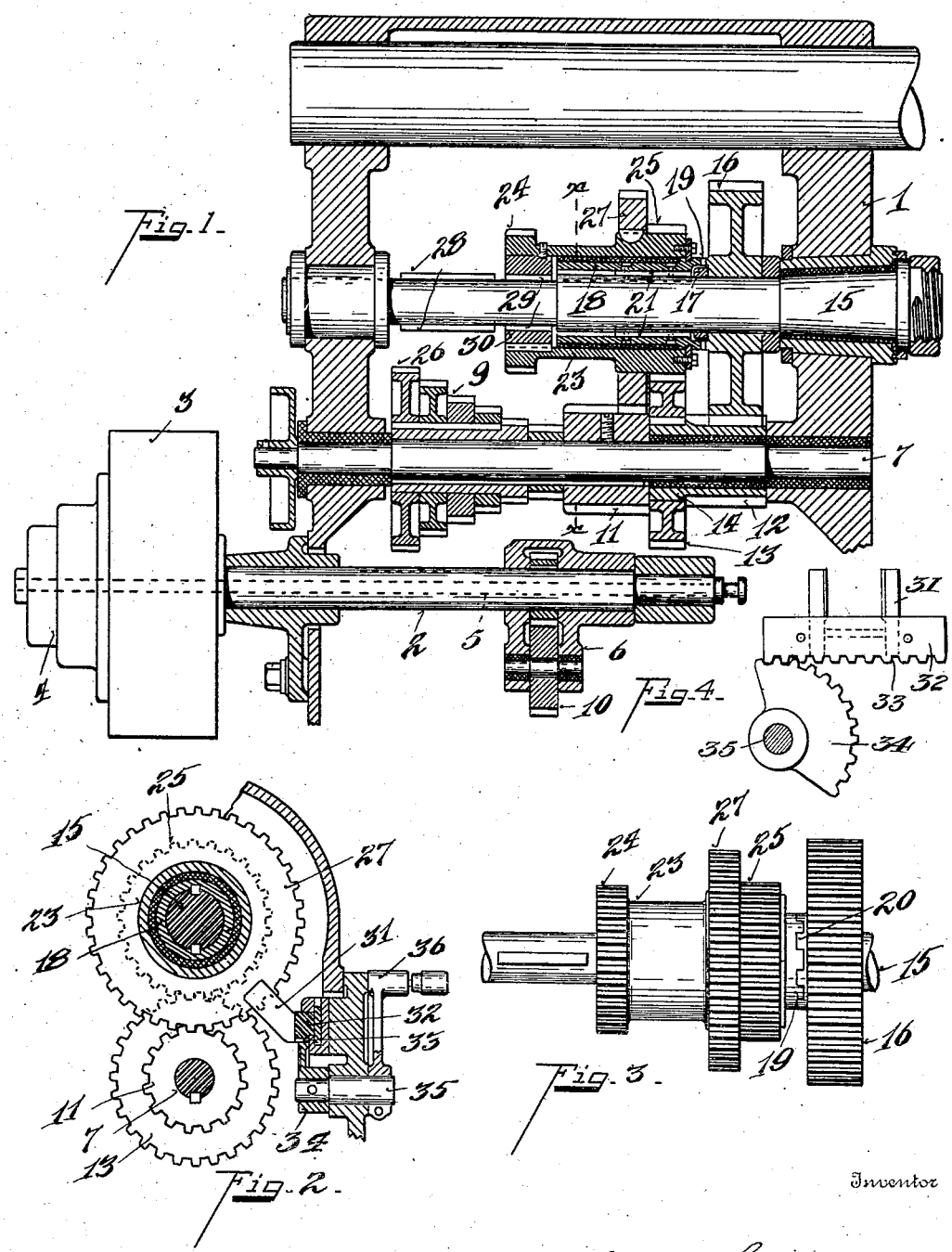
Witnesses
Inventor
Louis Thiel
By
Attorneys

UNITED STATES PATENT OFFICE.

LOUIS THIEL, OF CINCINNATI, OHIO.

VARIABLE-SPEED MECHANISM.

No. 879,215.  Specification of Letters Patent.  Patented Feb. 18, 1908.

Application filed June 3, 1907. Serial No. 377,071.

*To all whom it may concern:*

Be it known that I, LOUIS THIEL, a citizen of the United States, residing at Cincinnati, in the county of Hamilton and State of Ohio, have invented certain new and useful Improvements in Variable-Speed Mechanism, of which the following is a specification.

My invention relates to an improvement in a system of sliding gears for producing varying speeds.

One of the objects of my invention is to provide an arrangement of sliding gears in which when the gear or gears of the arrangement act as transmitters are in a fixed relation with the driven member upon which they are mounted, and in a released or loose position thereon when they are not acting as transmitters, and by the arrangement shown several changes of speed can be obtained with the gears in compact form and a powerful drive transmitted.

Another object of my invention is to provide an arrangement of sliding gears controlled by one lever in which they are intermeshed with selective gears upon a second shaft and clutched to the shaft upon which they are mounted.

The features of my invention will be more fully set forth in the description of the accompanying drawings forming a part of this specification, in which:—

Figure 1 is a central vertical section of my improved variable speed system. Fig. 2 is a section on line $x, x$, Fig. 1. Fig. 3 is a top plan view of the sliding gears illustrating the same in clutched position with a gear of the system. Fig. 4 is a detailed plan view of the rack and segment mechanism for shifting the sliding gears.

1 represents the frame of a machine for supporting the variable speed mechanism, and in this case, is shown as the head of a milling machine.

2 represents the driving shaft suitably journaled within the frame for imparting power to variable speed mechanism.

3 represents the main driving pulley.

4 represents the outer casing of friction clutch mechanism for clutching the driving pulley 3 to the driving shaft 2.

5 represents a rod for controlling the clutch mechanism projecting through a bore formed in the driving shaft for controlling the clutch mechanism in throwing on and off the power to the driving shaft 2. 6 represents a tumbler gear frame slidably mounted upon said shaft 2, carrying a series of tumbler gears for transmitting motion to the shaft 7 journaled in the frame 1. This shaft is provided with a cone of gears 9 into which the tumbler gear 10 is adapted to be thrown for imparting varying speeds to the shaft 7.

11 represents a wide faced gear fixed upon the shaft 7 adjacent to the cone 9.

12 represents a second gear loose upon the shaft 7.

13 represents a gear fixed upon the sleeve 14 of the gear 12, said gears 11, 12, and 13 being arranged in step form, adapted to mesh with gears mounted upon the spindle 15.

16 represents a gear loose on the spindle 15 and held in position by the collar 17, said gear being in mesh with gear 12 on shaft 7.

18 represents a sleeve slidably mounted upon the spindle 15, one end of which is provided with clutch teeth 19 adapted to engage with clutch teeth 20 formed on the gear 16.

21 represents keys fixed to the sleeve 18 adapted to slide in key-ways formed in the spindle 15.

23 represents a sleeve loosely mounted upon the sleeve 18, its ends being provided with the gear teeth 24, 25, cut around the periphery thereof, and for convenience we will term them gears 24, 25. Gear 25 is adapted to mesh with gear 13 fixed on the gear sleeve 14, and gear 24 is adapted to be meshed into gear 26 forming one of the gears of the cone 9 on shaft 7.

27 represents a gear fixed upon sleeve 23 in mesh with the elongated gear 11 on shaft 7.

28 represents keys fixed upon the shaft or spindle 15, and 29 represents key-ways formed in the sleeve 30 adapted to be brought into engagement with the keys 28 in a movement to the left of the sleeve 18. The sleeve 30 is fixed within one end of the sleeve 23 and moves therewith.

While I have shown the organization as applied to a milling machine, it is obvious that the same can be applied to any other machine tool, and that the spindle 15 may be an ordinary driving or driven shaft and I do not wish to be limited as to mounting the sliding gears upon the spindle of a milling machine.

The speeds transmitted from the driving or intermediate shaft 7 to the spindle 15 are as follows:—First, assuming the organization to be in the position shown in the drawings, (Fig. 1) motion is conveyed from shaft 7 to the spindle 15 through gear 11, gear 27, driving sleeve 23, thence through gear 25, gear 13, driving sleeve 14, which is loose on shaft 7, thence through gear 12 and gear 16 loose on the spindle 15, driving sleeve 18 which is clutched to the gear 16 and keyed to the spindle 15 driving the same for one speed. Second, assume that the sleeve 18 with its gear organization is moved to the left disengaging gear 25 from gear 13, and bringing the sleeve 30 into engagement with the keys 28, the sleeve 18 being disengaged from gear 16 before the sleeve 30 engages with the keys 28, motion will be imparted when the parts are in this position from the shaft 7 to the spindle 15, as follows:— from gear 11 through gear 27, driving sleeve 23, and thence driving the sleeve 30 which is in engagement with the keys 28, driving spindle 15. Third, assume that the sleeve 18 with its gear organization is moved to the extreme left position bringing gear 24 into engagement with gear 26, which will disengage gear 27 from the elongated gear 11 on shaft 7, and power will be transmitted directly from shaft 7 through gear 26 fixed on said shaft and gear 24 fixed to the sleeve 30, the latter being in turn keyed upon the spindle 15. By this arrangement it will be seen that three changes of speed are obtained between the driving and driven shafts, and the organization is such that the low speeds which are to carry the greatest strains are brought close to the work end of the spindle 15 while the higher speeds assume a position further away, thereby the twisting strains of the spindle 15 is thus reduced to a minimum.

The shifting of the sleeves and gear arrangement upon the spindle 15 is accomplished by the following instrumentalities:— 31 represents a yoke straddling the gear 27 and connected with the slide-plate 32, having a gibbed relation with the frame of the machine. Said slide plate 32 is provided with rack teeth 33 in mesh with the teeth of a segment 34 fixed upon the stud shaft 35, said stud shaft being suitably journaled in the frame and projecting through the same, and upon the free end of which is mounted a lever 36. Thus it will be seen that by manipulating the lever 36 the yoke 31 can be moved to the right or left bringing the gears 24, 27, and 25, into and out of engagement with the gears 26, 11 and 13 respectively upon shaft 7. This arrangement forms a convenient means for shifting the sliding gears on shaft or spindle 15.

Again, a system of tumbler gearing can be brought into engagement with the cone of gears upon shaft 7 for imparting an additional range of speed to the spindle 15.

Having described my invention, I claim:—

1. In a variable speed device, first and second shafts, a series of fixed and loose gears upon the first shaft, a pair of sleeves slidably mounted upon said second shaft, one of said sleeves being keyed to said shaft, the second sleeve adapted to be loose upon said second shaft in one position and fixed to said second shaft in a second position, a system of gearing loose upon said first sleeve and fixed to said second sleeve, a gear loose upon said second shaft adapted to be clutched with said first sleeve and in mesh with one of the gears upon said first shaft, the remainder of gears upon the second shaft being adapted to be thrown into selected engagement with respective gears on the first shaft for producing three changes of speeds to the second shaft, substantially as described.

2. In a variable speed device, first and second shafts, a series of fixed and loose gears upon said first shaft, a series of loose gears upon said second shaft slidably mounted, a loose gear mounted upon said second shaft in a fixed position, a sleeve keyed to said second shaft and movable with said slidable gears, adapted to be brought into driving relation with said fixed positioned gear, whereby one ratio of speed may be imparted from said first shaft to said second shaft with the slidable gears on the second shaft and the loose gears on the first shaft acting as intermediates, and means for fixing said slidable gears to said second shaft for producing other ranges of speed after they have been moved into selected position of engagement with the respective gears on the first shaft, substantially as described.

3. In a variable device, first and second shafts, a series of fixed and loose gears on said first shaft, a series of loose gears upon said second shaft slidably mounted, a loose gear mounted upon said second shaft in a fixed position, clutch mechanism for clutching said fixed positioned gear to the second shaft, said sliding gears remaining loose upon said second shaft when said fixed positioned gear is clutched to its shaft for imparting one ratio of speed, and means for fixing said slidable gears to said second shaft for producing other ranges of speed after they have been moved into selected position of engagement with the respective gears on the first shaft and after the fixed positioned gear has been unclutched from the second shaft, and means for shifting said sliding gears, substantially as described.

4. In a variable speed device, first and second shafts, a series of fixed and loose gears on said first shaft, a series of loose gears slidably mounted on said second shaft, adapted to be simultaneously shifted and brought into selective engagement with their respective gears of intermesh upon the first shaft, a loose gear mounted upon said second shaft in a fixed position, and clutching means carried by said sliding gears for clutching said fixed positioned gear to its shaft when the sliding gears are unclutched from said second shaft, and vice versa, substantially as described.

In testimony whereof I have hereunto set my hand.

LOUIS THIEL.

Witnesses:
OLIVER B. KAISER,
LEO O'DONNELL.